(No Model.)

E. A. WILCOX.
PLOW BEAM.

No. 377,472. Patented Feb. 7, 1888.

ATTEST.
J. Henry Kaiser
Jno. L. Condon

INVENTOR
Edgar A. Wilcox
By Fitzgerald & Co
Attys.

UNITED STATES PATENT OFFICE.

EDGAR A. WILCOX, OF MONTEREY, MICHIGAN.

PLOW-BEAM.

SPECIFICATION forming part of Letters Patent No. 377,472, dated February 7, 1888.

Application filed October 11, 1887. Serial No. 252,050. (No model.)

*To all whom it may concern:*

Be it known that I, EDGAR A. WILCOX, a citizen of the United States, residing at Monterey, in the county of Allegan and State of Michigan, have invented certain new and useful Improvements in Plow-Beams; and I do hereby declare the following to be a full, clear, and exact description of the invention, such as will enable others skilled in the art to which it appertains to make and use the same.

My invention has relation to improvements in plows having a colter provided with an auxiliary mold-board; and it consists in the construction and arrangement of parts, as will be hereinafter described, and particularly pointed out in the claim.

Figure 1:
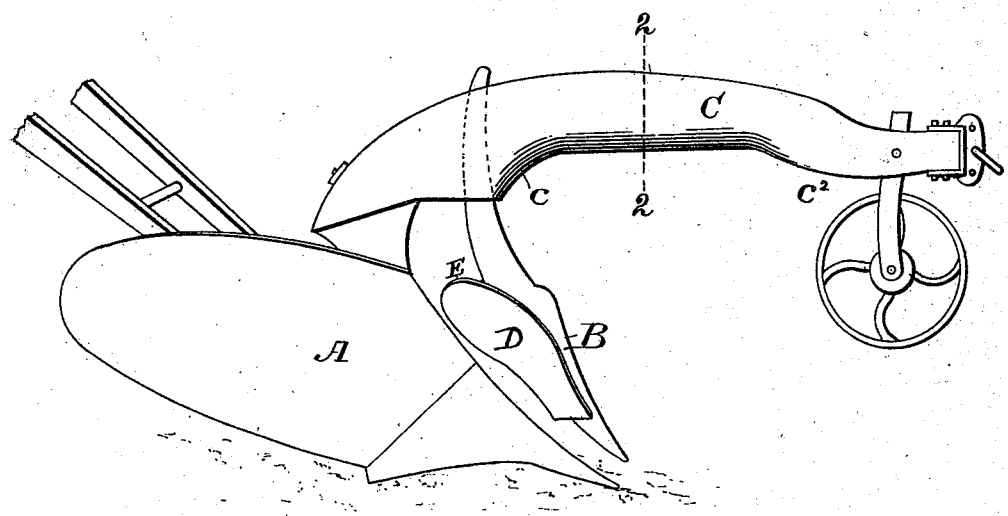
Figure 2:
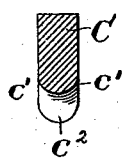

In the accompanying drawings, Figure 1 is a side elevation of my plow with the colter having the auxiliary mold-board connected thereto. Fig. 2 is a cross-section of the beam on the line 2 2 of Fig. 1 and looking toward the clevis.

Referring to the drawings, A represents the plowshare, B the colter, and C the plow-beam. The beam C is formed at $c$ with an upward curve, which extends lengthwise and in front of the colter, as shown in Fig. 1, and the under side of the beam is rounded off, as shown at $c'$. The beam is made of wood or iron, and at its front end is curved, as shown at $c^2$. The colter B is secured at its upper end in the plow-beam C, immediately in rear of the curve $c$ of the same. Said colter is secured in place in any of the ways commonly practiced, and is curved downward and forward in front of the plowshare A, the point of the colter being almost directly over the point of the plowshare. A short distance above its point the colter is provided with an auxiliary mold-board, D, the lower edge of which is bounded by a horizontal line, while its upper portion is enlarged and rounded on its edges, as shown at E, which gives the colter the best form to enable it carry the cornstalks, straw, or weeds under the furrow. The colter and auxiliary mold-board catch the cornstalks, straw, or weeds, and they are dragged along thereby until the mold-board A of the plow turns the furrow onto the rear ends of the cornstalks, straw, or weeds, as the case may be, and holds and causes said cornstalks, straw, or weeds to fall into the furrow, where they will be entirely covered by the dirt as the plow is drawn forward. Should any of the cornstalks, straw, or weeds rise as high as the beam C, its rounded lower side between the points $c$ and $c^2$ will afford no place for them to catch, so as to tear or break them apart, so that practically all of the cornstalks, straw, or weeds will be caught and covered into the furrow by this simple contrivance.

The peculiar curvature at $c$ constitutes an important feature of my invention in connection with the colter having the auxiliary mold-board. The curved form of the under side of the plow-beam, as shown at $c'$, is also important, as it enables the beam to remain free from the cornstalks, straw, and weeds.

I am aware that it is old to construct a plow with its beam rounded transversely on its under side, and to provide a colter located immediately in front of the plowshare. I am also aware that a slotted colter has been provided with a mold-board secured to it by bolts, so that the latter may be raised or lowered, so that the point of the colter may cut deeper or lighter, as may be desired. I am further aware that a jointer or skimmer and a weed-turner have been made adjustable on the colter of a plow, and such constructions and arrangement I do not claim; but I am not aware that it is old to provide a plow-beam curved lengthwise, as herein shown, with a colter having a side mold-board, the curve of the beam being in front of the colter and share, for the purpose described.

Having described my invention, what I claim is—

The combination, with the plow-beam C, rounded or curved lengthwise of the beam between the points $c\ c^2$, of the plowshare A, and the downwardly and forwardly curved colter B, provided with the auxiliary mold-board D, situated immediately in front of the plow, and the said curve of said plow-beam being in front of the points of the colter and plow, as shown and described.

In testimony whereof I affix my signature in presence of two witnesses.

EDGAR A. WILCOX.

Witnesses:
 FRANK NOGGLE,
 WALLACE GOODELL.